United States Patent
Braunecker et al.

(10) Patent No.: US 6,297,497 B1
(45) Date of Patent: Oct. 2, 2001

(54) METHOD AND DEVICE FOR DETERMINING THE DIRECTION IN WHICH AN OBJECT IS LOCATED

(75) Inventors: Bernhard Braunecker, Rebstein; Bernhard F. Gaechter, Balgach, both of (CH); John Rice Rogers, Sierra Madre, CA (US)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/194,260
(22) PCT Filed: May 23, 1997
(86) PCT No.: PCT/EP97/02659
  § 371 Date: Nov. 25, 1998
  § 102(e) Date: Nov. 25, 1998
(87) PCT Pub. No.: WO97/45751
  PCT Pub. Date: Dec. 4, 1997

(30) Foreign Application Priority Data

May 25, 1996 (DE) .............................. 196 21 195

(51) Int. Cl.⁷ ....................................... H01J 3/14
(52) U.S. Cl. ................... 250/216; 250/201.9; 250/206.1; 356/121
(58) Field of Search .................. 250/216, 201.9, 250/203.1, 203.2, 203.4, 203.6, 237 R, 206.1, 206.2; 356/121, 375, 484, 488, 499, 521, 512; 359/562, 563

(56) References Cited

U.S. PATENT DOCUMENTS 4,112,294 * 9/1978 Pressiat .............................. 250/203.3

FOREIGN PATENT DOCUMENTS 665 715    5/1988 (CH) .
32 33 013  3/1984 (DE) .

OTHER PUBLICATIONS

Huep, W. & Katowski, O., "Theodolitsysteme Für Industrielle und Geodätische Messungen," Technische Rundschau, No. 39, 1988.

* cited by examiner

*Primary Examiner*—Que T. Le
*Assistant Examiner*—Thanh X. Luu
(74) *Attorney, Agent, or Firm*—Foley & Lardner

(57) ABSTRACT

The invention concerns a method and device for determining the direction of an object (10) which emits or reflects optical radiation. An optical element (14) which structures the wavefront of the radiation converts the conventional dot-type image (20) into an intensity distribution (14') with more than one maximum on a locally resolving opto-electronic detector (13). From the intensity distribution (14') and the structure function of the optical element (14), the direction of the object (10) can be determined with a high degree of accuracy over a wide measurement range. In addition, this gives a design with a shorter optical path length and very few optical components.

12 Claims, 6 Drawing Sheets

METHOD AND DEVICE FOR DETERMINING THE DIRECTION IN WHICH AN OBJECT IS LOCATED

Figure 1A:
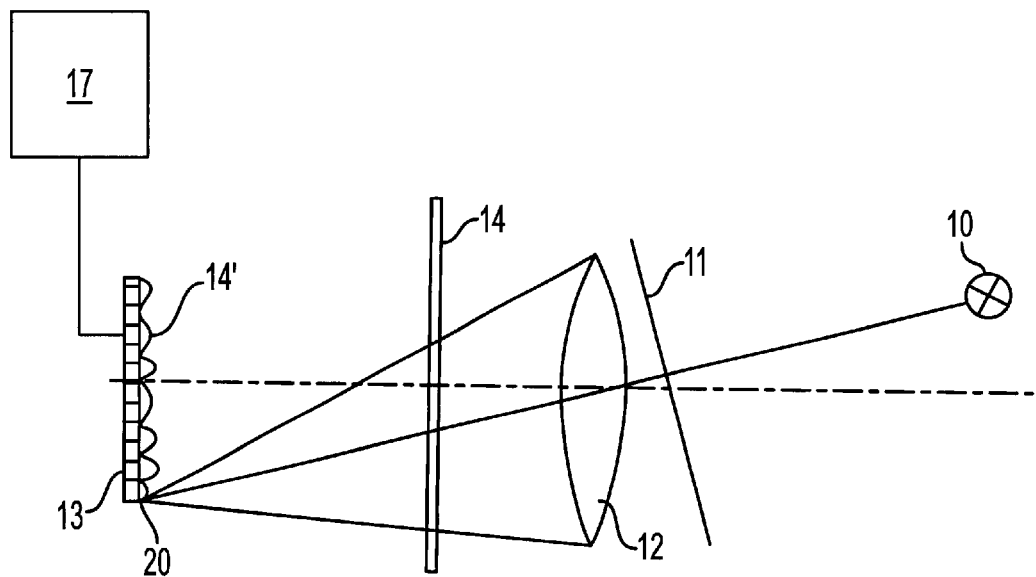

The invention relates to a method and a device for determining the direction, defined by a horizontal and vertical angle, to an object which emits or reflects optical radiation, the radiation being picked up by an imaging optical system for producing an object image on a spatially resolving optoelectronic detector, the detector signals being fed to an evaluation device, and the direction to the object being determined from the coordinates of the object image on the detector.

The radiation coming from the object is intended to lie in the optical wavelength region and to be emitted, scattered or reflected by the object.

DE 32 33 013 A1 has disclosed an optical arrangement with the aid of which it is possible to detect and evaluate the spatial position of a 3-dimensional object by means of edge detection, and to determine the distance from the object. This arrangement can be applied chiefly in image evaluation systems for automatic manipulators. Two serially arranged lenses with different diaphragm openings, a raster filter and a television camera are used to detect the position of the three dimensions. Specific geometrical relationships are maintained both between these subassemblies inside the optical arrangement and in addition to the object to be imaged, in order to satisfy the imaging equations.

The raster filter comprises spatially distinctive, periodic structures such as, for example, sinusoidally cambered surfaces, lenses, cylindrical lenses or prisms with a prescribed bevel, or prism elements arranged in a crossed fashion. These structures make use of the refraction of the light beams, which are thereby deflected by a specific angle α and thus displace the object points to be imaged. The brightness transitions at the edges of the object are periodically modulated by the periodic structures of the raster filter. They are picked up line by line by the television camera, and the signals are electronically evaluated. The periodic disturbances of the edge image contain in a form coded by the raster filter the information on the rotary position and the course of the object contours. The distance from the object is likewise derived, on the basis of the existing functional relationships, from the superimposition of the imaged object contours with the raster structure of the raster filter.

The use of refractive, spatial structures for the raster filter, as well as the use of two lenses and the maintenance of a series of geometrical conditions signify a comprehensive outlay on production and adjustment. Recording by the television camera is performed with the resolution prescribed by the video scanning.

CH 665 715 A5 has disclosed a method for measuring the angular displacement of an object by means of an object-referred aiming marker designed as an optically structured scanning disk. In this case, an image of the aiming marker is photoelectrically evaluated, and the information thus obtained is compared with a reference marker corresponding to the aiming marker. In detail, the aiming marker, which is provided with a defined center, is imaged onto the detection plane of a detector array, whereupon the values thus obtained are subjected to a correlation comparison with the reference marker. The displacement at the center of the aiming marker from the optical axis is then calculated from the result of the comparison. The available resolution of the structure and position of the object is given in this known method first and foremost by the individual detection ranges of the detector array, that is to say discrete pixel geometry, and correspondingly limited.

Under the title of "Theodolitsysteme für industrielle und geodätische Messungen" ["Theodolite systems for industrial and geodetic measurements"], there is a description on pages 14 to 18 of the journal entitled Technische Rundschau No. 39, 1988 by W. Huep and O. Katowski of theodolite systems which are used for contactless measurement of surfaces such as, for example, claddings of aircraft or body parts with the aid of reflecting aiming markers. In this case, a search light arranged coaxially with the axis of the theodolite telescope illuminates an aiming marker which is imaged by the theodolite telescope on a CCD array as a spatially resolving detector. An electronic evaluation device with a computer determines the center point of the aiming marker image. The horizontal and vertical angle of the aiming marker are determined in a prescribed coordinate system from the coordinates of the center point of the aiming marker image on the CCD array.

Surface-reflecting spheres, for example chromized, polished steel spheres, which present the same aiming marker image in each case irrespective of the direction of observation serve as aiming markers. The reflecting spheres produce a virtual image, situated in the interior of the sphere, of the search light pupil of the theodolite, which is observed with the telescope of the theodolite and represented on the CCD array. Because of the short focal length of the spheres, however, the pupil image in the sphere is already small, as a result of limitation by diffraction, given a short distance between the theodolite and sphere, and it is smaller on the CCD array than the pixel size thereof. In order for it to be possible to take any picture at all, the theodolite telescope is defocused so as to produce a light spot which can be picked up by a plurality of pixels of the CCD array. The center point of the light spot thus obtained is determined by center or contour evaluation. However, because of the defocusing the different intensity distribution of the radiation in the light spot and its fuzzy edge leads to measuring errors.

In general, of course, it is possible to use lenses with a large image scale or an image scale which can be varied for range adjustment, in order to obtain a sufficiently large image on the CCD array. As a result, said defocusing of the theodolite telescope in order to produce a sufficiently large light spot diameter could be eliminated, for example. However, a large image scale entails the use of a correspondingly large lens focal length. Special telescope lenses or collimators have focal lengths of 2 m and more for this purpose. In this case, the range of angular measurement is necessarily substantially restricted for the same detector size. In addition, collimators with such focal lengths produce large-volume optical instruments of high weight.

It is the object of the invention to specify a method and a device by means of which it is possible, with a very low outlay on optical components and adjustments and in conjunction with drastically shortened mechanical overall lengths, to determine the direction of the optical radiation coming from an object within a large range of angular measurement, the aim being to achieve a precision which goes far beyond the spatial resolving power, conditioned by the design, of an optoelectronic detector to be used.

According to the invention, this object is achieved by virtue of the fact that an optical element is used to structure the wavefront of the radiation coming from the object in such a way that an intensity distribution with more than one intensity maximum is produced on the detector, and in that the direction to the object is determined from the measured intensity distribution by making use of the structure function of the optical element. Furthermore, the object is achieved by means of the features specified in the characterizing part of the device claim 3.

Advantageous developments and improvements of the invention follow from the features of the subclaims.

The radiation emitted by a point light source propagates spherically in all spatial directions in a homogeneous medium. This means that the surfaces of the same phase are spherical surfaces and expand. A spherical surface is virtually flat when seen at a large distance from its center point and in a small section. If the opening of an imaging optical system corresponds to this section, said opening receives an approximately plane wave or—seen in the beam image— virtually parallel beams.

The imaging optical system, which in the simplest case can be represented by a collective lens, focuses such radiation in its focal plane. Consequently, a point light source which is far removed appears in a punctiform fashion in the focal plane of the imaging optical system. The same also holds for an approximately punctiform radiation spot produced by projection of a radiation source on a remote object. Radiation emitted by a radiation source and shaped by an optical device to form a parallel beam is likewise imaged by the imaging optical system in a punctiform fashion in its focal plane. In this case, the parallel beam can reach the imaging optical system directly or via the path of a reflection at a flat object.

Given a sufficient spatial resolving power, a spatially sensitive detector arranged in the focal plane of the imaging optical system records the punctiform image as an intensity maximum at a specific location. This location on the detector depends on the angle which the parallel beam forms with the optical axis of the imaging optical system. With increasing angle, the punctiform image moves away from the optical axis. In the case of three-dimensional viewing, and with a detector which is spatially sensitive in two dimensions, each coordinate point on the detector is uniquely assigned a direction of the incident radiation, the direction being given by a horizontal and vertical angle. Thus, if there is a change in direction of the incident radiation owing to a change in one or both of these angles, there is a consequent change in the coordinates of the radiation point on the detector surface.

This description also holds for problems where it is desired to measure only one angle in a fixed plane. Specifying a second angle is not important for this purpose; it can be set arbitrarily to zero. A detector which is spatially sensitive in one dimension, such as a linear diode cell, for example, can also be used for such a case.

In addition to the plane waves previously considered, it is also possible, of course, for the imaging optical system to record spherical waves. In such a case, the object is located in the near zone of the imaging optical system, and emits or reflects punctiform radiation. As a result, it is necessary for the imaging optical system to be sharply focused, the object being imaged in the image plane of the imaging optical system. For the purpose of determining direction, it is then necessary in this case, of course, also to take account of the image distance set by the imaging optical system in addition to the coordinates of the image point on the detector.

According to the invention, there is brought into the beam path an optical element which structures the wavefront of the radiation coming from the object in such a way that instead of the conventional punctiform object image, an intensity distribution with more than one intensity maximum is produced on the detector. The optical element can fundamentally be arranged in this case at any point on the beam path. However, it is preferably arranged in the vicinity of or directly in the plane of the exit pupil, or in a pupil plane of the imaging optical system which is conjugate thereto. Of course, a conjugate pupil plane can also be situated upstream of the imaging optical system, that is to say between the imaging optical system and the object, it being possible for the optical element structuring the wavefront also to be arranged there.

The physical effect of the optical element on the wavefront of the radiation can be described mathematically in a unique way by the structure function of the optical element, which is determined by the structure of the optical element. The structure function acts on the wavefront of the radiation and leads to a corresponding intensity distribution on the detector. Because of the uniqueness of this relationship, it is possible in reverse sequence to use the measured intensity distribution and the structure function of the optical element to reconstruct the incident wavefront, and thus the direction of the origin thereof, that is to say the direction of the radiation coming from the object. It is also possible, in principle, for the result of a preceding calibration to be used instead of the structure function of the optical element.

Various optical properties can be utilized to realize such an optical element structuring the wavefront. Thus, for example, the wavefront of the radiation can be spatially influenced by refractive, reflective or polarizing properties, or also by the effect of diffraction.

When refractive structures are used, the optical element is characterized by refractive indices or material thicknesses which differ as a function of location. In order to achieve a desired intensity structure on the detector, the spatial wavefront modulation can be appropriately varied by means of the refractive index function and/or thickness function producing them. The refractive index function and thickness function represent the structure function of the optical element.

Regions which polarize differently as a function of location can be used in a similar way. Dichroitic materials yield linear polarization which, depending on the alignment of these materials lead [sic] to different polarization directions as a function of the location. In general, different elliptical states of polarization are also possible, and these are produced, for example, with the aid of spatially varying thickness of birefringent materials. With the aid of an analyzer, a corresponding intensity distribution is produced on the detector from the spatial polarization modulation, which in this case represents the structure function of the structuring optical element.

The optical element according to the invention can also be represented with the aid of diffractive structures. For this purpose, it is possible to use Fresnel zone plates or holographic elements, for example, in the case of which the grating structure varies locally. Such diffractive structures can be produced on a carrier by various lithographic, etching or vapor-deposition methods, or by embossing, bright pressing or milling. In this case, the carrier can be transmitting or reflecting for the radiation, that is to say the optical element can be used to transmit or reflect.

Finally, it is also possible to utilize for the optical element all the physical effects which produce a spatial modulation, conditioned by the structure of the optical element, of the wavefront from the incident radiation, doing so in such a way that an intensity distribution with more than one intensity maximum is produced on the detector. The intensity distribution can also be regarded as an intensity pattern or as a code. In the event of a change in direction of the incident radiation, the intensity pattern or the code is displaced on the detector.

The evaluation of the measured intensity distribution is performed, for example, using the known methods of averaging or by fit algorithms. They supply a substantially improved accuracy in the measurement of direction by comparison with the evaluation of an individual radiation point, because evaluating the position of an extended structure leads to a better signal-to-noise ratio. In addition, there is a substantial reduction in the risk of overexposing the detector, which is otherwise always present in the case of focusing the incident radiation onto only a single radiation point. Moreover, the evaluation of an intensity distribution is more reliable, because disturbances in the beam path are easily compensated by measuring a multiplicity of radiation points of the intensity distribution.

A particularly improved spatial resolving power, and thus a particular measurement sensitivity for determining direction is yielded by an intensity distribution whose spatial fundamental frequency or one of its spatial harmonic frequencies forms with the spatial fundamental frequency of the radiation-sensitive structures of the detector a low-frequency heterodyne pattern. The low-frequency heterodyne pattern acts in the same way as a moire pattern. It is known that moire patterns react very sensitively to a displacement of the structures producing them. This means here that even a very slight displacement of the intensity distribution on the detector with respect to its pixel structure produces a strong change in the spatial frequency of the low-frequency heterodyne pattern. The change in the heterodyne pattern is therefore a very sensitively reacting indicator of changes in the intensity distribution on the detector. Spatial information can therefore be resolved more effectively by a factor of more than 100 than would be possible from the geometry of the pixel structure of the detector. The result of this is a correspondingly high accuracy in the determination of angle and direction relative to the object.

In addition to raising the accuracy and the robustness of directional measurement, the production of a structured light distribution on the detector is attended further by the additional advantage of the expansion of the range of measurement. In the case of a punctiform light distribution, the range of directional measurement is determined by the size of the detector surface. However, in the case of a structured intensity distribution, it is the extent of the spatial structures which is decisive. This can be substantially larger than the detector surface. It is possible to determine direction even if a relatively large part of the intensity distribution is no longer situated inside the active detector surface. This is illustrated by the following example.

The diffraction at a simple diffraction grating with rectilinear structures is sufficient to produce on the detector an intensity distribution with a principal maximum and a plurality of secondary maxima arranged on both sides. In this case, the secondary maxima, that is to say the diffraction maxima of higher order, can overreach the active detector surface. If, because of a large angle of incidence of the radiation, the principal maximum, which corresponds to the original punctiform imaging of the radiation source, is no longer situated on the active detector surface, it can be reconstructed from the position of the secondary maxima. The only decisive point is that the secondary maxima can be identified, and this is possible in principle because of their different intensities.

In summary, the advantages of the invention consist in that a higher measurement accuracy and a wider measurement range for determining the direction to an object are rendered possible with the aid of the optical element structuring the wavefront. A simple imaging optical system with a short focal length suffices because of the substantially improved spatial resolving power. This results advantageously, on the one hand, in substantially shortened mechanical overall lengths and a lesser outlay on optical components and adjustments. There is thus an improvement in manipulation and costs. On the other hand, short focal lengths permit a wider range of angular measurement relative to the object. Said range is moreover further substantially widened beyond the size of the detector because of the expanded intensity distribution. The result of this is that it is still possible to determine direction even if the conventional object image is already located outside the radiation-sensitive surface of the detector.

Figure 1B:
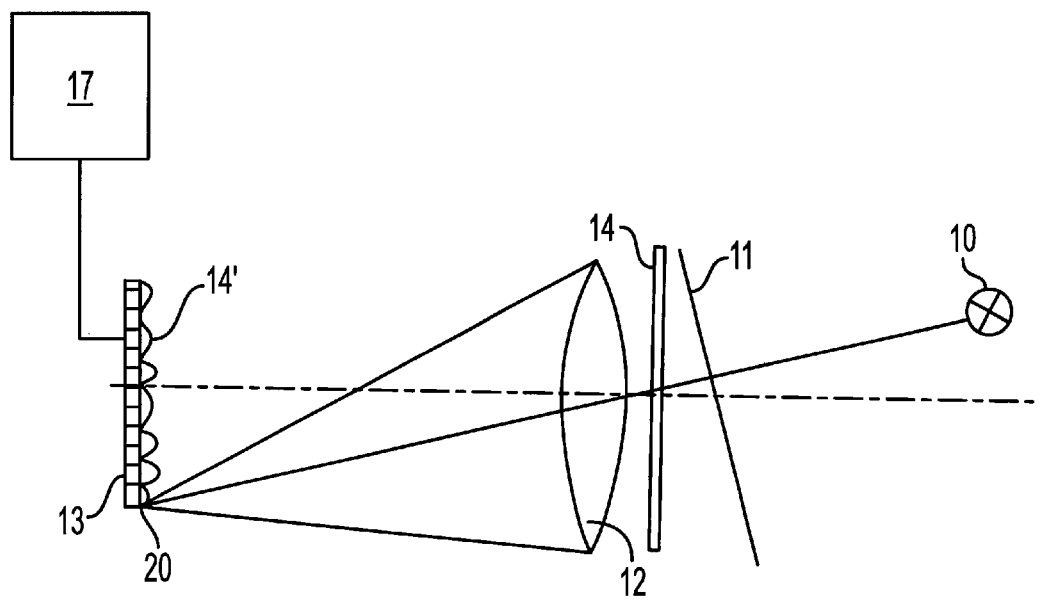
Figure 2:
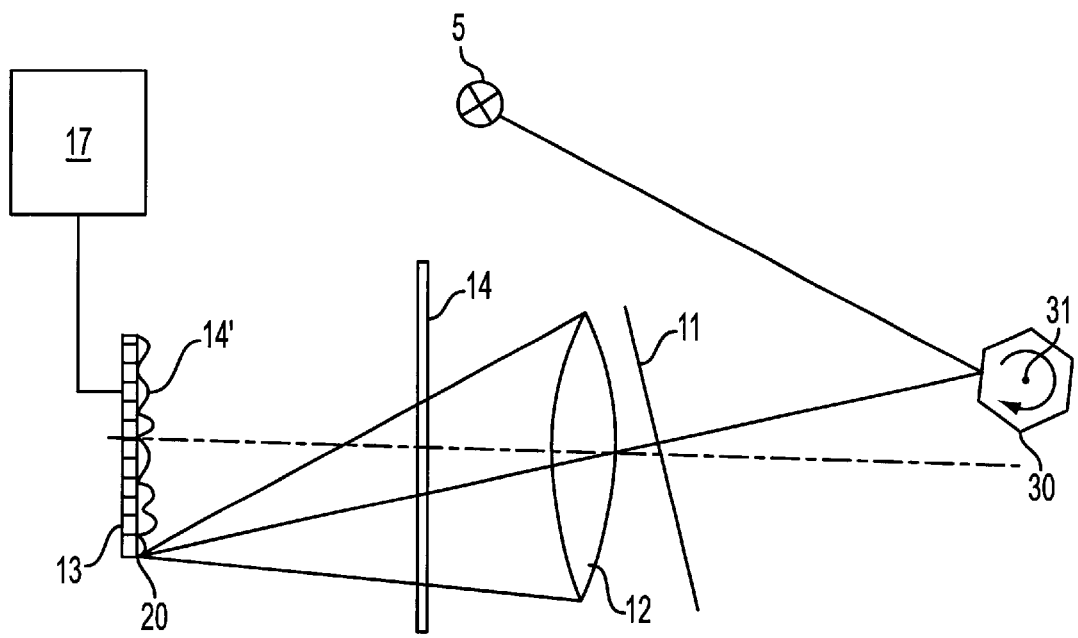
Figure 3:
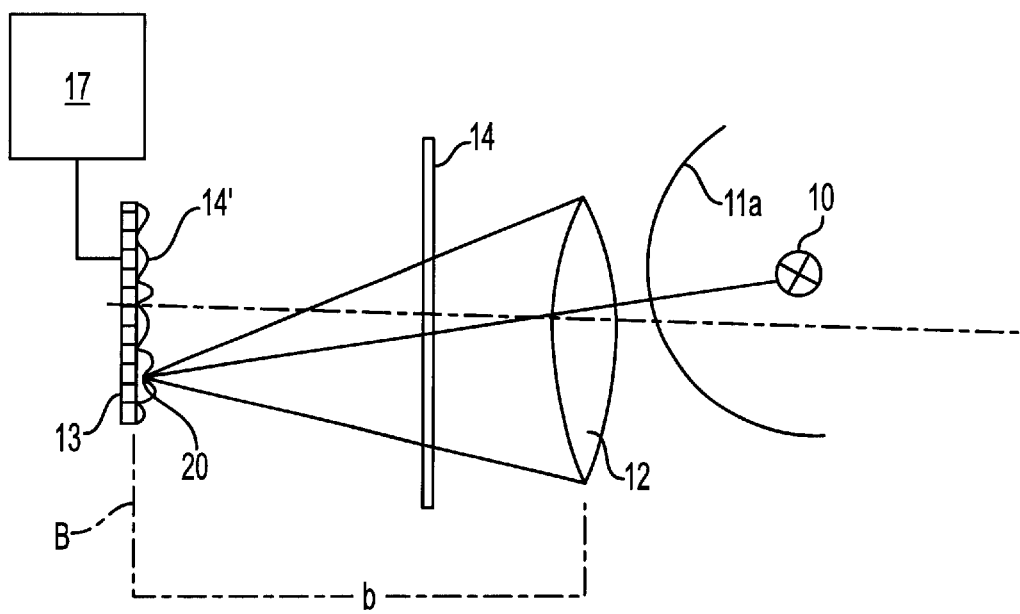
Figure 4:
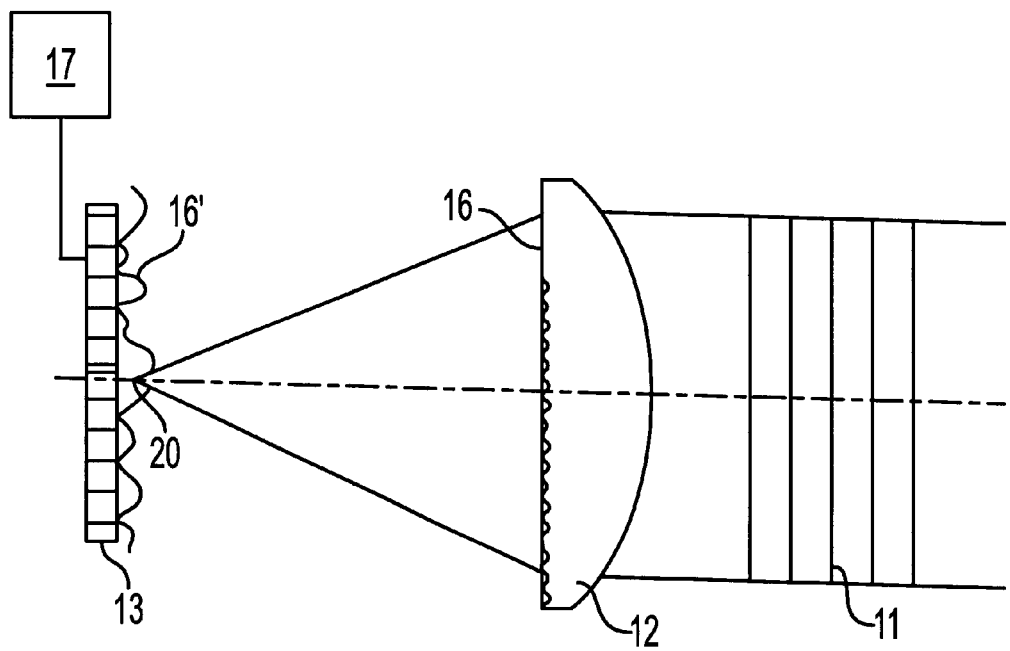
Figure 5:
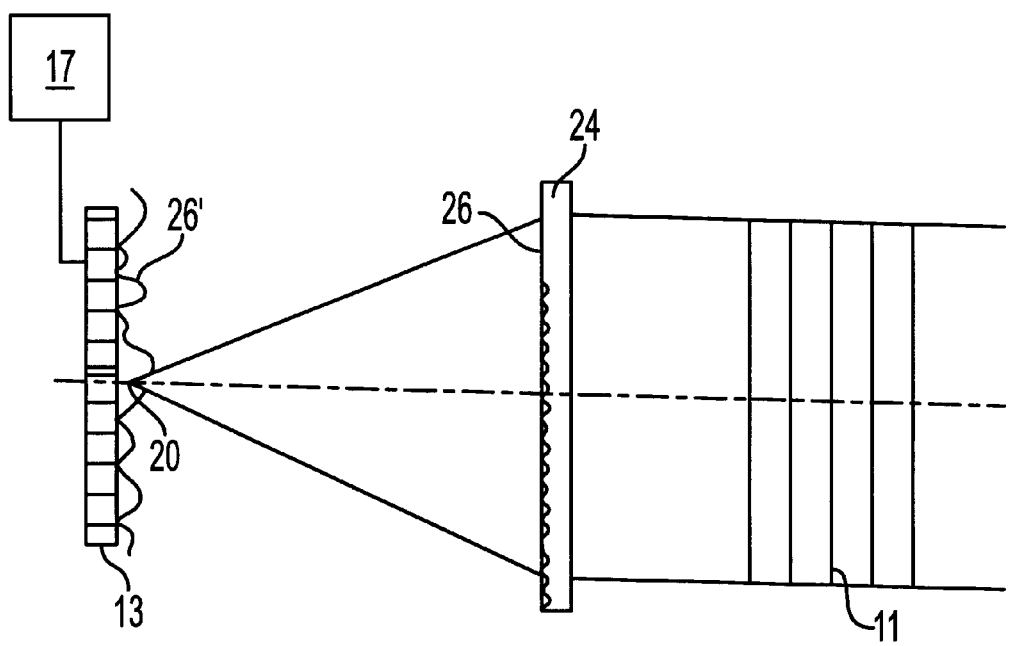
Figure 6:
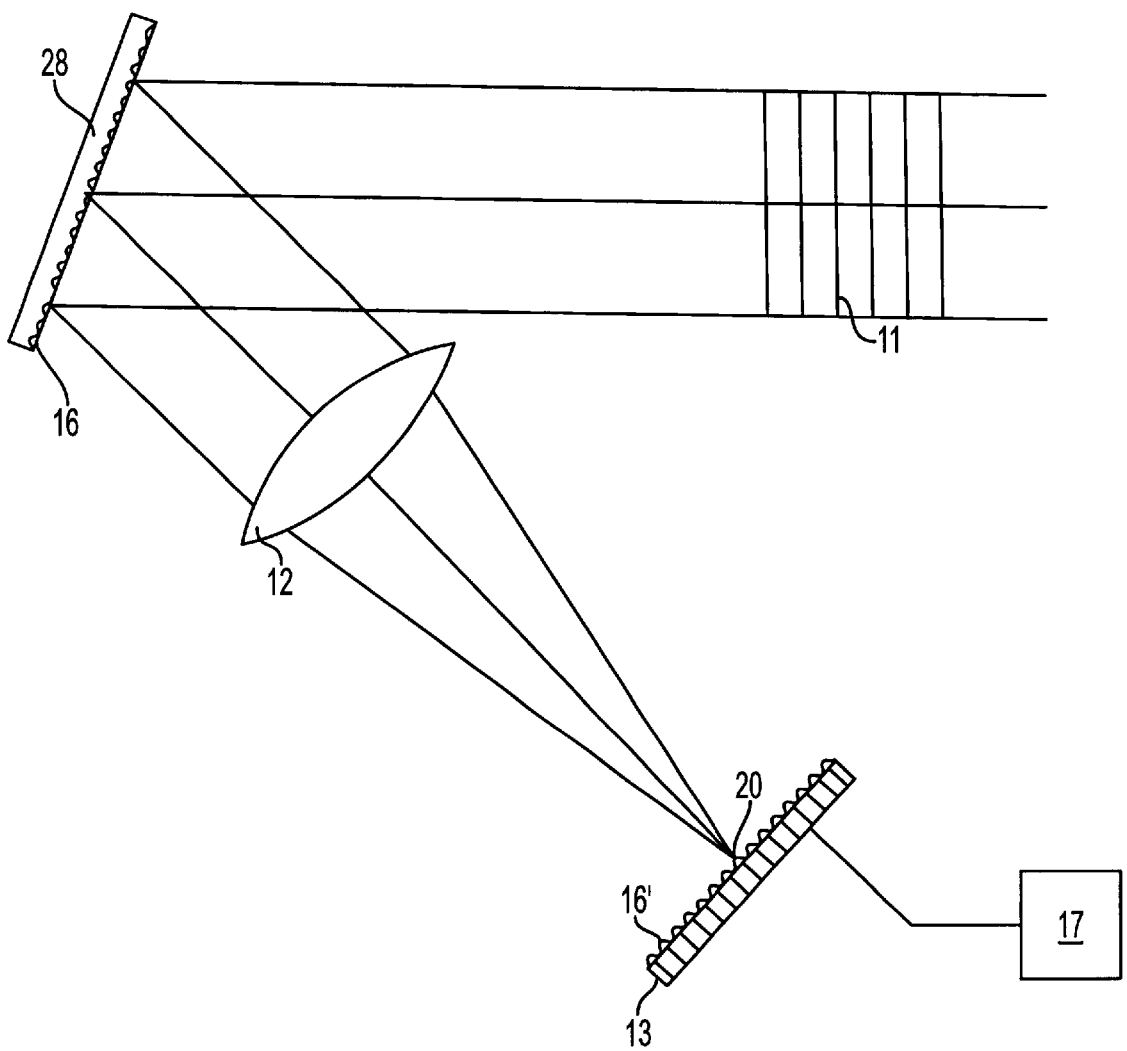
Figure 7:
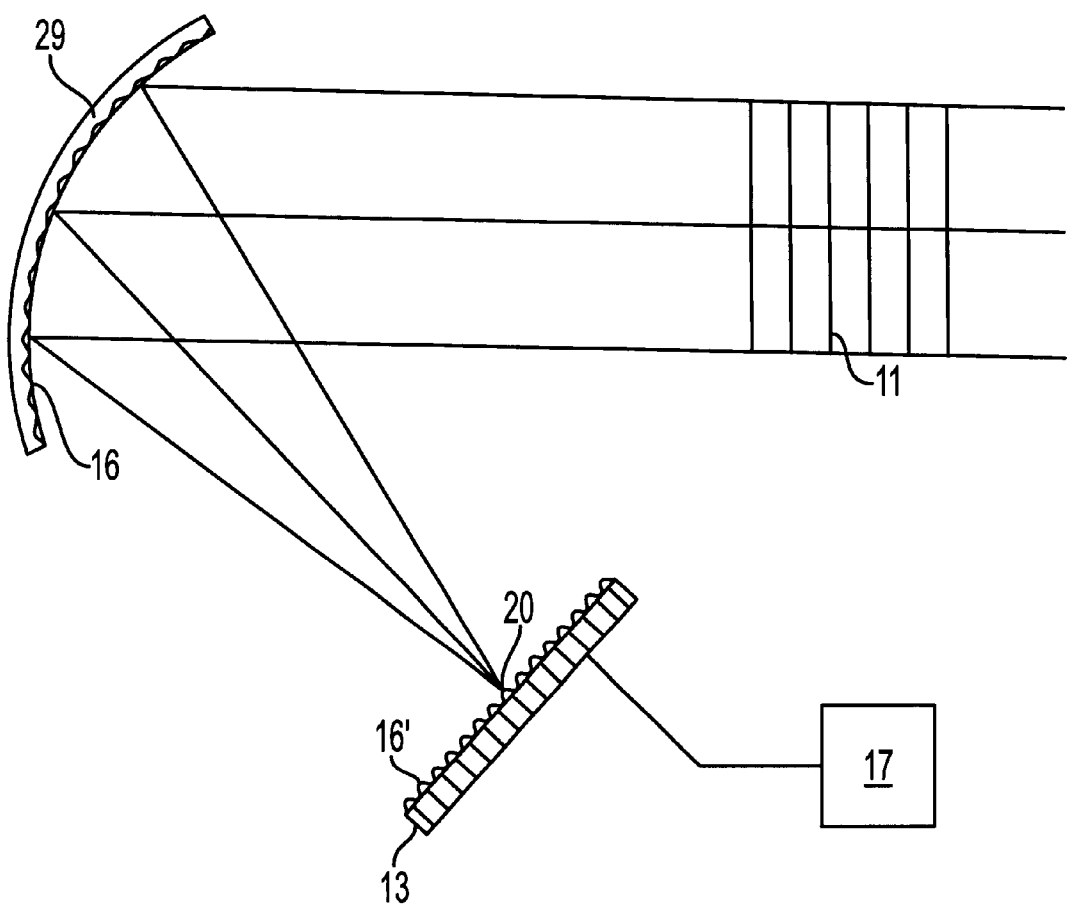
Figure 8:
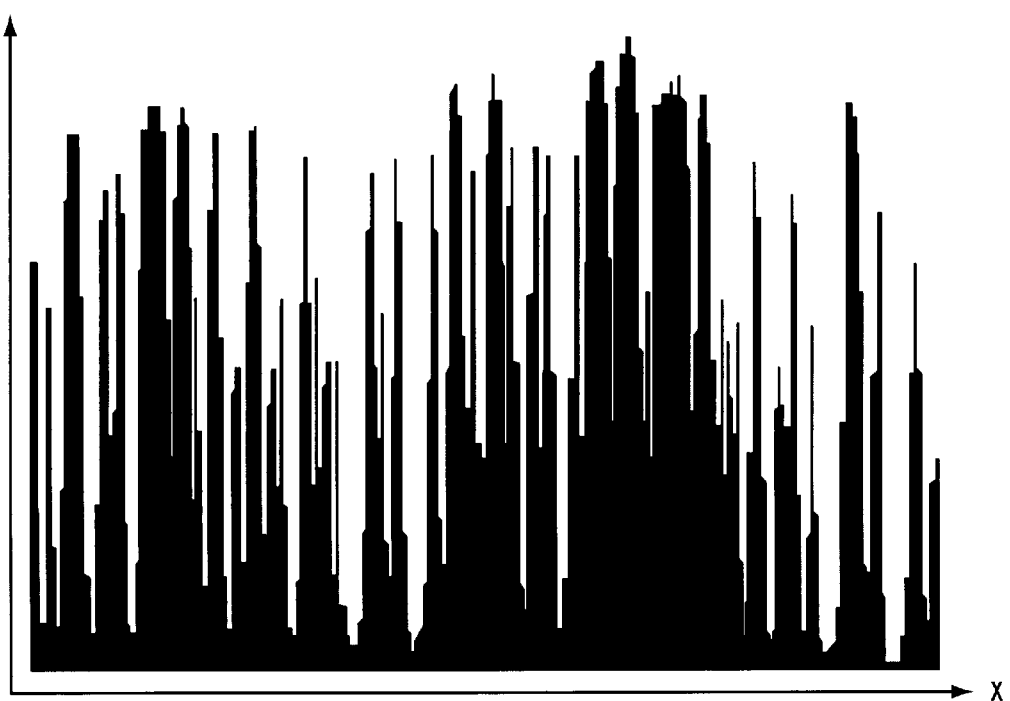

The following exemplary embodiments of the invention are explained in more detail with the aid of the drawing, in which:

FIG. 1a shows a diagrammatic representation of an optical element structuring the wavefront of radiation in transmission and which is arranged separately between an imaging optical system and a detector, the incoming radiation having plane wavefronts, FIG. 1b shows a diagrammatic representation as in FIG. 1a, but with the optical element arranged between the imaging optical system and the radiation source, FIG. 2 shows a diagrammatic representation in accordance with FIG. 1a, in which the radiation reflected by a rotary mirror is picked up, FIG. 3 shows a diagrammatic representation in accordance with FIG. 1a, it being the case, however, that the incoming radiation has spherical wavefronts, FIG. 4 shows a diagrammatic representation of the subject-matter of the invention, the structures modulating the wavefront of the radiation in a spatial fashion being applied directly to a surface of a refractive imaging optical system, FIG. 5 shows a diagrammatic representation of an optical element which structures the wavefront of the radiation and simultaneously has imaging properties, FIG. 6 shows a diagrammatic representation of an optical element which operates by reflection and structures the wavefront of the radiation, FIG. 7 shows a diagrammatic representation of the subject matter of the invention, the structures modulating the wavefront of the radiation in a spatial fashion being applied to a surface of a reflective imaging optical system, and FIG. 8 shows an intensity distribution produced with the aid of the optical element according to the invention.

FIG. 1a shows a diagrammatic representation of an optical element 14 which structures the wavefront of radiation and operates by transmission. The optical element 14 is arranged separately between an imaging optical system 12, in this case a lens with a refractive optical system, and a spatially resolving optoelectronic detector 13. The observed object 10 here takes the for m of a remote radiation source, the radiation falling into the imaging optical system 12 having approximately plane wavefronts 11. The observed object 10 can also be a reflecting body which is illuminated by the radiation of a radiation source or by scattered light, and whose reflected radiation with approximately plane wavefronts 11 is picked up by the imaging optical system 12.

Without the optical element 14, the incoming plane wavefronts 11 would be imaged by the imaging optical system 12 in a punctiform fashion at the location 20 on the detector 13. The diameter of this radiation spot is generally small by comparison with the light-sensitive structures of the detector 13. The spatial fundamental frequency (scanning frequency) of the light-sensitive detector structures is therefore too small to detect the high spatial frequency components of the punctiform intensity distribution.

If the inventive optical element 14 structuring the wavefront 11 of the radiation is then introduced into the beam path in accordance with FIG. 1a, the incoming wavefronts 11 are spatially modulated in such a way that instead of the punctiform image 20 of the object 10 an intensity distribution 14' with more than one intensity maximum is produced on the detector 13. The detector signals are transmitted into an evaluation device 17 in which the position of the intensity maxima of the intensity distribution 14' is determined. The horizontal and vertical angles of the incident wavefronts 11, that is to say the direction to the observed object 10, are determined therefrom with the aid of the structure function of the optical element 14.

This direction can be determined with particular precision when the spatial fundamental frequency or one of the spatial harmonic frequencies of the intensity distribution 14' forms a low-frequency heterodyne pattern with the spatial fundamental frequency of the detector structures. This heterodyne pattern is very sensitive to lateral movements of the object 10, that is to say to changes in direction of the radiation falling into the imaging optical system 12, which effect corresponding displacements in the intensity distribution 14' on the detector 13. As a result, it is also possible to perform a very precise dynamic measurement and to exactly record, measure and track a lateral movement of the object 10. If, in the process, the object 10 leaves the detecting range of the arrangement in FIG. 1a, it is possible for the object 10 to be tracked continuously over the entire range of solid angle by motorizing and automating the arrangement.

A glass plate with a structure which has been etched in serves here as an optical element 14 structuring the wavefront. The optical element 14 is thus monolithically integrated in the glass substrate. It is also possible to use an amplitude or phase hologram. Other possibilities of realization have already been named above. The optical element 14 is preferably arranged in the vicinity or in the exit pupil of a pupil plane, conjugate thereto, of the imaging optical system 12. Such a conjugate pupil plane can also be situated upstream of the imaging optical system 12, that is to say between the latter and the object 10. An optical element 14 arranged at this point is shown in FIG. 1b.

The representation in accordance with FIG. 2 shows as observed object a rotary mirror 30 which is assembled in this exemplary embodiment from 6 plane mirrors. Its rotation axis 31 is arranged in a stationary fashion. A radiation source 5 is likewise arranged in a stationary fashion and illuminates the rotary mirror 30, which reflects the incident radiation. The angle of reflection is a function of the rotary position of the rotary mirror 30 in this case. As a result, the reflected radiation has a direction assigned to the rotary position. A rotary movement of the rotary mirror 30 effects a change in direction of the reflected radiation. The rotary position of the rotary mirror 30 can be determined with high precision with the aid of the arrangement represented and of the measurement of direction according to the invention.

In the representation according to FIG. 3, the imaging optical system 12 receives spherical wavefronts 11a. The object 10 is thus located in the close vicinity of the imaging optical system 12. In order to ensure imaging, detector 13 is therefore located in an image plane B. Depending on the distance between the object 10 and the imaging optical system 12, when focusing is performed there is a change in the image distance b and thus in the position of the intensity distribution on the detector. This is to be taken into account when determining the direction.

In the exemplary embodiment according to FIG. 4, the imaging optical system 12 is shown as a plane-convex lens. Structures 16 are applied to its plane surface. The structures 16 resemble those of the optical element 14 as mentioned in the description of FIG. 1a. In particular, the structures 16 can also be diffraction structures. They are produced, for example, by etching or vapor deposition or applied as film. Instead of a punctiform image 20, supplying only a little information, of the incident plane wavefronts 11, the structures 16 produce an intensity distribution 16'. For the measurement of direction, this results in the advantages already mentioned of the higher measurement accuracy, the lightening of the measurement range and the compactness of the opto-mechanical design. In addition, in this exemplary embodiment the low outlay on components is also illustrated, there being finally only a single optical component.

FIG. 5 shows an optical element 24 which has properties which image with the aid of its structures 26, and which at the same time structures the wavefront of the incident radiation. Consequently, the structures 26 produce from the incident wavefronts 11 an intensity distribution 26' consisting of a plurality of intensity maxima, in conjunction with simultaneous focusing.

In the exemplary embodiments according to FIGS. 1–5, the optical elements structuring the wavefront of the radiation operate by transmission. By contrast, FIG. 6 shows an optical element 28 structuring the wavefront which operates by reflection. The same structures 16 as in the case of the transmissive optical element 14 can be used with a silvered back of the optical element 28. The structures 16 can, however, also have properties which are already inherently reflective. The imaging of the radiation is performed by means of the refractive imaging optical system 12.

On the other hand, it is also possible to use a reflective imaging optical system such as, for example, a concave mirror 29 in accordance with FIG. 7, to image the wavefronts 11. In this exemplary embodiment, the structures 16, which produce the intensity distribution 16', are applied to the inner surface of the concave mirror 29. The principle of the mode of operation corresponds to that of the above exemplary embodiments.

In the case of the use of a detector 13 which is spatially sensitive in two dimensions, the intensity distribution, such as is produced with the aid of one of the optical elements which structure the wavefront and are shown in FIGS. 1–7, is detected in two dimensions simultaneously. FIG. 8 shows one excerpt from this two-dimensional intensity distribution, specifically the variation in the intensity as a function of the coordinate x for a specific coordinate y of the detector 13. Moreover, it is known that a one-dimensional detector 13 which is spatially sensitive only in the x coordinate can suffice for detection of the two-dimensional position of an intensity distribution. In this case, however, it is necessary to use a special intensity distribution which is a unique function of the y coordinate. A plane incident wavefront 11 will be assumed below by way of example, in order to determine the direction to the object 10 from such a two-dimensional intensity distribution detected by a linear or two-dimensional detector 13.

A plane wave coming from a specific reference direction is described by the electric field strength $E = A * \exp(ikr)$, where A is a complex amplitude which describes the temporal variation (of no interest here) and the initial phase of the wave, and k is the wavenumber vector and r is the space vector, which are in the complex exponent of the e function. The wavenumber vector k is perpendicular to the wavefront 11 and therefore specifies the direction of the radiation and therefore also the direction to the object. The electric field strength E is multiplied by the structure function S, which depends on the space coordinates, of the optical element, which is known when the element is produced. An intensity distribution for the reference direction is yielded after Fourier transformation and, if appropriate, after calculation of the Fresnel integral and formation of the square of the modulus.

In visual terms, this intensity distribution is present as an aerial image in the detector plane. The detected image is produced from this aerial image by the structures of the optoelectronic detector 13, which are discrete, that is to say consist of individual pixels. The detected image can be calculated from the aerial image by continuing the previous computing cycle with the aid of the known detector structures. This calculation can be performed by pointwise integration of the aerial image, that is to say by integration using each pixel, or else by mathematically equivalent methods.

A lateral movement of the object 10, that is to say a change in the direction to the object 10, leads to a change in the angle of incidence of the incident wave and thus, in the simplest case, to a lateral offset of the detected image. In such a case, the offset of the detected image with respect to the image calculated for the reference direction can be determined by correlation or by other estimating algorithms. Since the relationship is known between this offset and the horizontal and vertical angle of incidence of the radiation relative to the reference direction, these angles of incidence are finally determined as directional coordinates of the object 10.

In other cases, for example when low-frequency heterodyne patterns are formed by superimposing the spatial frequencies present in the aerial image with the spatial frequency of the detector 13, there is a more complex relationship between the aerial image and the detected image. An offset of the aerial image additionally leads to a change in the shape of the detected image. In such a case, the interaction between the aerial image and the radiation-sensitive structures of the detector 13 must be taken into account in an estimating algorithm.

Moreover, it is also possible to determine the direction to an extended object 10 which itself has structures. When such an object 10 is imaged, the object image naturally also contains the corresponding structures of the object 10, and this is enough to produce an intensity distribution on the detector 13 without an optical element structuring the wavefront. However, such an intensity distribution is structured in a substantially even finer fashion by the optical element, as is illustrated by the intensity distribution in accordance with FIG. 8. With the multiplicity of intensity maxima, this can therefore also be declared to be an intensity pattern or a code. The code is additionally impressed on the pure object image. Of course, in the case of an extended object 10 provided with structures it is necessary to know its structure function, which likewise features in the computing cycle described.

What is claimed is:

1. A method for determining a direction, defined by a horizontal and vertical angle, to an object which emits or reflects optical radiation, comprising:

receiving the radiation by an imaging optical system for producing an object image on a spatially resolving optoelectronic detector;

communicating detector signals to an evaluation device;

determining the direction to the object from coordinates of the object image on the detector; and structuring a wavefront of the radiation coming from the object with an optical element such that an intensity distribution with more than one intensity maximum is produced on the detector; and further determining the direction to the object from a measured intensity distribution on the basis of the wavefront structuring by the optical element.

2. The method according to claim 1, wherein a spatial fundamental frequency or a spatial harmonic frequency of the intensity distribution produced by the optical element on the detector forms a low-frequency heterodyne pattern with the spatial fundamental frequency of radiation-sensitive structures of the detector.

3. A device for determining a direction, defined by a horizontal and vertical angle, to an object which emits or reflects optical radiation, comprising:

an imaging optical system for producing an object image;

a spatially resolving optoelectronic detector for detecting the object image;

an evaluation device; and an optical element, arranged in a beam path between the object and the detector, which structures a wavefront of the radiation coming from the object such that an intensity distribution with more than one intensity maximum is produced on the detector, and wherein the direction to the object is determined in the evaluation device from a measured intensity distribution by using the wavefront structuring of the optical element .

4. The device according to claim 3, wherein the optical element structuring the wavefront of the radiation is arranged in a plane of an exit pupil or in a pupil plane of the imaging optical system conjugate thereto.

5. The device according to claim 3, wherein the optical element structuring the wavefront of the radiation is applied to a surface of the imaging optical system.

6. The device according to claim 3, wherein the optical element structuring the wavefront of the radiation simultaneously has imaging properties.

7. The device according to claim 3, wherein the optical element contains structures which refract differently as a function of location.

8. The device according to claim 3, wherein the optical element contains diffraction structures.

9. The device according to claim 3, wherein the optical element contains structures which polarize the radiation differently as a function of location.

10. The device according to claim 3, wherein the optical element structuring the wavefront of the radiation operates by transmission.

11. The device according to claim 3, wherein the optical element structuring the wavefront of the radiation operates by reflection.

12. A device for determining a direction, defined by a horizontal and vertical angle, to an object which emits or reflects optical radiation, comprising:

an imaging optical system for producing an object image;

a spatially resolving optoelectronic detector for detecting the object image;

an evaluation device; and an optical element, arranged in a beam path between the object and the detector, which structures a wavefront of the radiation coming from the object such that an intensity distribution with more than one intensity maximum is produced on the detector, and wherein the direction to the object is determined in a time independent manner in the evaluation device from a measured intensity distribution by using the wavefront structuring of the optical element.

* * * * *